United States Patent Office 3,248,405
Patented Apr. 26, 1966

3,248,405
PROCESS FOR THE PREPARATION OF 21-HALO-19-NOR-ETHISTERONES AND THE 3-ENOL ETHERS THEREOF
John Fried, Plainfield, Thomas B. Windholz, Westfield, and Thomas S. Bry, Linden, N.J., assignors to Merck & Co. Inc., Rahway, N.J., a corporation of New Jersey
No Drawing. Filed Feb. 9, 1962, Ser. No. 172,105
8 Claims. (Cl. 260—397.4)

This invention is concerned generally with novel steroid compounds and processes of preparing the same. More particularly, it relates to novel processes for the preparation of 21-halonorethisterones and the 3-enol ethers, thereof, starting with 3-keto-17-oxygenated-19-nor-4-androstene compounds. The 21-halonorethisterones and 3-enol ethers thereof, subject of the present invention, possess useful therapeutic properties as orally and parenterally active progestational agents.

These 21-halonorethisterone compounds, and their 3-enol ethers (i.e., 17α-haloethynyl-19-nor-3,5-androstadiene-3,17β-diol 3-ether) may be chemically represented as follows, wherein the 21-halonorethisterone compounds are represented by structural Formula A and the corresponding ethers by structural Formula B:

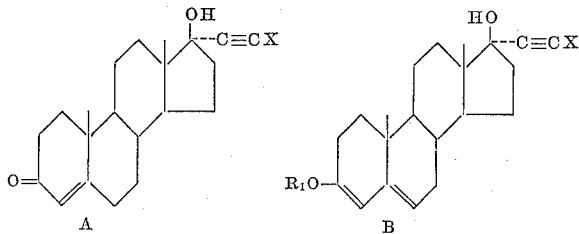

A                B wherein X stands for chloro or bromo, and $R_1$ is a hydrocarbon or substituted hydrocarbon substitutent as, for example, an aliphatic or substituted aliphatic radical such as alkyl or aralkyl, more particularly, methyl, ethyl, butyl, amyl, benzyl, a cycloaliphatic or cycloalkyl grouping such as cyclopentyl, cyclohexyl, and the like.

The 21-halonorethisterones may be prepared, in accordance with one aspect of the present invention, starting with 19-nor-4-androstene-3,17-dione. This 19-nor-4-androstene-3,17-dione is reacted with a haloethyne to form the corresponding 17α-haloethynyl-19-nor-4-androstene-17β-ol-3-one which has the following structural formula:

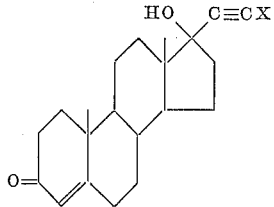

wherein X stands for chloro or bromo.

In a preferred embodiment of this procedure, the haloethyne is formed in situ by the reaction of a 1,2-dihaloethylene (preferably the cis form) and methyl lithium. For example, the 17α-chloroethynyl-19-nor-4-androstene-17β-ol-3-one is prepared by adding a solution of cis-1,2-dichloroethylene in ether to a solution of methyl lithium in ether. The reaction mixture is stirred for 1–2 hours, and to the resulting solution containing the chloroethyne is added 19-nor-4-androstene-17-one, and stirring is continued for several hours longer.

The 17α-haloethylnyl-9-nor-4-androstene-17β-ol-3-one (i.e., the 21-halonorethisterone) is conveniently recovered by adding water to the solution, and chromatographing the aqueous phase, employing, for example, acid-washed alumina. Elution with ether-petroleum ether mixtures affords the desired product upon drying.

Alternatively, and in accordance with another aspect of the present process, the 21-halonorethisterone compounds and the 3-enol ethers thereof may be prepared starting with 19-nor testosterone (i.e. 19-nor-4-androstene-17β-ol-3-one), which has the following structural formula:

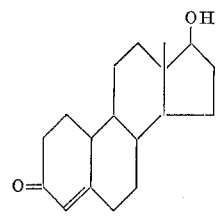

This starting material is conveniently converted to the corresponding 21-halonorethisterone by first reacting the 19-nortestosterone with an alkyl orthoformate, a cycloalkylorthoformate or the like in the presence of an acidic catalyst to form the corresponding 3,5-androstadiene-17β-ol-3-enol ether. This compound is then oxidized to the corresponding 17-keto steroid employing, for example, chromic acid and pyridine or aluminum isopropoxide and cyclohexanone in an inert solvent. The resulting 3,5-androstadiene-17-one 3-enol ether may then be haloethynylated by reaction of the steroid with a haloethyne to form the 17α-haloethynyl-19-nor-3,5-androstadiene-17β-ol-3-enol ether compound, which, upon hydrolysis, with, for example, p-toluenesulfonic acid, results in the formation of the corresponding 21-halonorthisterone compound.

In the first step of this process, the 3-enol ethers of 21-halonorethisterone compounds are conveniently formed by reacting an alkyl orthoformate, a cycloalkyl orthoformate, or aralkyl orthoformate, such as ethyl orthoformate, propyl orthoformate, n-butyl orthoformate, cyclopentyl orthoformate, cyclohexyl orthoformate, benzyl orthoformate, and the like, an an acidic catalyst such as 2,4-dinitrobenzene sulfonic acid, p-toluenesulfonic acid, and the like, with a solution of the 19-nor-testosterone in dioxane and stirring the resulting mixtures together at room temperature. The acidic catalyst is then neutralized with a base such as $NaHCO_3$ pyridine, or the like, and the 19-nor-4-androstene-17β-ol-3-one 3-enol ether, as for example, 3-alkoxy-19-nor-3,5-androstadiene-17β-ol, such as 3-ethoxy-19-nor-3,5-androstadiene-17β-ol; 3-propoxy-19-nor-3,5-androstadiene-17β-ol; 3-n-butoxy-19-nor-3,5-androstadiene-17β-ol; 3 cycloalkoxy-19-nor-3,5-androstadiene-17β-ol, such as 3-cyclopentyloxy-19-nor-3,5-androstadiene-17β-ol; 3-benzyloxy-19-nor-3,5-androstadiene-17β-ol; 3-hexyloxy-19-nor-3,5-androstadiene-17β-ol; 3-aralkoxy-19-nor-3,5-androstadiene-17β-ol, such as 3-benzyloxy-19-nor-3,5-androstadiene-17β-ol; and the like, are recovered from the neutralized reaction mixture.

Alternatively, the 19-nor-3,5-androstadiene-17β-ol 3-enol ethers, other than the 3-enol ethyl ethers, may be conveniently prepared starting with said 3-enol ethyl ether (e.g., 3-ethoxy-19-nor-3,5-androstadiene-17β-ol) by mixing together the latter compound and an inert hydrocarbon solvent such as isooctane and an alcohol such as propanol, n-butyl alcohol, amyl alcohol, a cycloaliphatic alcohol, as, for example, a cycloalkanol such as cyclohexanol, cyclopentanol, an araliphatic alcohol, as for example, an aralkanol such as benzyl alcohol, and the like, and an acidic catalyst such as p-toluenesulfonic acid, and heating the resulting mixture, preferably under reflux, in an apparatus equipped with means for removing the water from the distillate and returning the dry distillate to the reaction mixture. The acid catalyst is then neutralized with a base such as pyridine, and the resulting neutral solution is evaporated to dryness in vacuo to give the 19-nor-3,5-androstadiene-17β-ol 3-enol ether, which is conveniently purified by crystallization from methanol containing traces of pyridine, or by chromatography.

The 19-nor-3,5-androstadiene-17β-ol 3-enol ethers are then oxidized to the corresponding 19 - nor - 3,5 - androstadiene-17-one 3-enol ethers. This may conveniently be achieved by contacting a solution of the steroid in a solvent such as a mixture of cyclohexanone and toluene with a solution of aluminum isopropoxide in toluene at reflux temperature for about 1–2 hours. The solution is then desirably neutralized with a buffering agent, preferably a saturated Rochelle salt solution, and recovery is effected by chromatography over acid-washed alumina and elution with ether-petroleum ether mixtures. Alternatively, chromic acid dissolved in pyridine may be employed as the oxidizing agent in which case pyridine is preferably employed as the steroid solvent. Recovery is effected by chromatography over acid-washed alumina and elution with ether-petroleum ether mixtures.

The 19-nor-3,5-androstadiene-17-one 3-enol ether is then conveniently reacted with a haloethyne to form the corresponding 17α-haloethynyl-19-nor-3,5-androstadiene-17β-ol 3-enol ether. Preferably, the steroid is formed by reaction with a 1,2-dihaloethylene (preferably in the cis form) and methyl lithium in ether at room temperature for about 24–36 hours. Recovery may be effected by chromatography using, for example, acid-washed alumina followed by elution with ether-petroleum ether mixtures and drying the resulting eluant.

The desired 17α-haloethynyl-19-nor-4-androstene-17β-ol-3-one (i.e., 21-halonorethisterone) is then obtained from the corersponding 3-enol ether by hydrolysis, preferably with a strong acid such as p-toluenesulfonic acid. This is conveniently accomplished by contacting a solution of the steroid in acetone with p-toluenesulfonic acid and allowing the mixture to stand for 24–36 hours at room temperature. The desired 4-androstene is then recovered by extracting an aqueous solution of the mixture with chloroform or ether and concentrating the resulting extract in vacuo. The 21-halonorethisterone product may be further purified by chromatography, as for example, over acid-washed alumina.

Instead of forming the 3-enol ethers of 19-nor-testosterone in the foregoing procedure, alternatively it is possible to react the starting material with a ketalizing agent, as for example, ethyleneglycol, to produce the corresponding 3 - ethylenedioxy - compound. Thereupon, the 17-hydroxy group may be oxidized to the corresponding 17-keto compound, followed by reaction with a haloethyne and hydrolysis of the 3-ethylenedioxy group to form the corresponding desired 21 - halonorethisterone compound.

Unlike the reaction of the 19-nortestosterone starting material with an enolizing agent, however, the resulting 3-ketal is a mixture of a 5(6)-androstene and a 5(10)-androstene. Removal of the 3-ketal protective group at this or any succeeding step by treatment with a strong acid such as p-toluenesulfonic acid or concentrated HCl gives the corresponding Δ⁴-androstene compound. Alternatively, treatment of the 3-ketal-5(6) -androstene and 3-ketal-5(10)-androstene mixture with approximately 70% aqueous acetic acid for about 1 hour at room temperature affords a mixture of the corresponding 3-keto-4-androstene and 3-keto-5(10)-androstene. These compounds can be separated by chromatography over acid-washed alumina and elution with ether-petroleum ether mixtures.

In the first step of this process, the 3-keto group is protected by reacting the 19-nortestosterone starting material with a ketalizing agent as for example excess ethyleneglycol in benzene, toluene or the like, in the presence of an acid catalyst such as p-toluenesulfonic acid or sulfuric acid. Alternatively, exchange dioxolation may be employed using such reactants as acetone ethylene ketal, butanone ethylene ketal and the like in an acid-catalyst medium. Recovery of the resulting 3-ketal when employing ethyleneglycol as the protective agent affords a mixture of 3 - ethylenedioxy-19-nor-5-androstene-17β-ol and 3-ethylenedioxy-19-nor-5(10)-androstene-17β-ol.

The 3 - ethylenedioxy-19-nor-5-androstene-17β-ol and 3-ethylenedioxy-19-nor-5(10)-androstene-17β-ol may be converted to their corresponding 17-keto compounds by oxidation, employing either chromic acid in pyridine or, preferably, aluminum isopropoxide and cyclohexanone dissolved in benzene, toluene or the like. Thus, the oxidation may be carried out by dissolving the mixture of steroids in a solvent mixture of cyclohexanone and toluene and reacting this mixture with aluminum isopropoxide in toluene for 1–2 hours at reflux temperature. The solution is then desirably neutralized with a buffering agent, preferably a saturated solution Rochelle salt solution. Recovery, for example, by chromatography, affords a mixture of 3-ethylenedioxy-19-nor-5-androstene-17-one and 3-ethylenedioxy-19-nor-5(10)-androstene-17-one.

Reaction of this steroid mixture with a haloethyne produces the corresponding 3-ethylenedioxy-17α-haloethynyl-19-nor-5-androstene-17β-ol and 3-ethylenedioxy-17α-haloethynyl-19-nor-5(10)-androstene-17β-ol. This reaction is conveniently carried out by reacting the steroid mixture dissolved in a solution of benzene and ether with a 1,2-dihaloethylene (preferably the cis form) and methyl lithium in ether at room temperature for about 24–36 hours. Recovery of the mixture of 17α-haloethynyl compounds is conveniently effected by chromatography over acid-washed alumina followed by elution with ether-petroleum ether mixtures.

The desired 17α-haloethynyl-19-nor-4-androstene-17β-ol-3-one (i.e. 21-halonorethisterone) is obtained from the corresponding mixture of 3-ethylenedioxy-17α-haloethynyl-19-nor-5-androstene-17β-ol and 3-ethylenedioxy-17α-haloethynyl-19-nor-5(10)-androstene-17β-ol by hydrolysis with a strong acid, preferably concentrated HCl. This is readily achieved by contacting a solution of the steroid mixture in acetone with concentrated HCl and allowing the mixture to stand at room temperature for 12–24 hours. The desired 4-androstene is then recovered by extracting an aqueous solution of the mixture with ether or chloroform and concentrating the resulting extract in vacuo. The 21-halonorethisterone product may be further purified by chromatography over acid-washed alumina.

The following examples illustrate methods of carrying out the present invention, but it is to be understood that these examples are given for purposes of illustration and not of limitation.

*Example 1*

A solution consisting of 1.7 g. (1.32 cc.) of cis-1,2-dichloroethylene in 10 cc. of sodium-dried ether is added over 0.5 hour to 3 cc. of a 1.4 N-solution of methyl iodide in dry ether solution under nitrogen at about 10° C., in 25 cc. of sodium-dried ether. The reaction mixture is stirred at room temperature under nitrogen for an additional 1½ hours, followed by the addition, over a 15-minute period, of 100 mg. of 19-nor-4-androstene-3,17-dione in 4 cc. of sodium-dried ether. The mixture is left stirring at room temperature overnight, poured into ice water and extracted with ether. The ether extracts are washed with water, dried over sodium sulfate and concentrated in vacuo. The residue is chromatographed on 10 g. of acid-washed alumina. The product is eluted with petroleum ether: ether 8:2. Crystallization from acid-free methanol affords 17α-chloroethynyl-19-nor-4-androstene-17β-ol-3-one.

In accordance with the above procedures, but using 1,2-dibromoethylene in place of 1,2-dichloroethylene, there is obtained the 17α-bromoethynyl-19-nor-4-androstene-17β-ol-3-one.

Example 2

To a solution of 100 mg. of 19-nor-4-androstene-17β-ol-3-one in 3 cc. of dioxane is added 2 cc. of ethyl orthoformate and 10 mg. of p-toluenesulfonic acid. The reaction mixture is stirred at room temperature for 3 hours and 1 cc. of pyridine is added, followed by the dropwise addition of 5 cc. of water. The aqueous phase is separated and extracted with benzene. The organic extracts are washed with a sodium bicarbonate solution and then with water until the washings are neutral. The organic phase is dried over sodium sulfate and concentrated in vacuo to give 3-ethoxy-19-nor-3,5-androstadiene-17β-ol.

In accordance with the above procedure, but starting with n-butyl orthoformate in place of ethyl orthoformate, there is obtained the corresponding 3-n-butoxy-19-nor-3,5-androstadiene-17β-ol.

Example 3

A solution consisting of 3.0 g. of 19-nor-4-androstene-17β-ol-3-one, 6.0 ml. of cyclopentyl orthoformate and 120 mg. of p-toluenesulfonic acid in 30 ml. of cyclopentanol is allowed to stir for 3.5 hours at room temperature under nitrogen. The solution is poured into iced sodium bicarbonate solution and extracted with ether. The ether solution is dried and concentrated in vacuo to yield 3-cyclopentoxy-19-nor-3,5-androstadiene-17β-ol.

In accordance with the foregoing procedure, but starting with benzyl orthoformate in place of cyclopentyl orthoformate there is obtained the corresponding 3-benzyloxy-19-nor-3,5-androstadiene-17β-ol.

Example 4

A mixture of 50 mg. of 3-ethoxy-19-nor-3,5-androstadiene-17β-ol, 5.5 ml. of isooctane, 25 mg. of cyclohexanol and 2.5 mg. of p-toluenesulfonic acid is heated under reflux for a period of approximately 32 hours in an apparatus providing for the separation of water from the condensate before return to the refluxing mixture. The reaction mixture is cooled, 0.1 ml. of pyridine is added to neutralize the p-toluenesulfonic acid catalyst, and the liquid is completely evaporated in vacuo to dryness to give as the residual product 3-cyclohexyloxy-19-nor-3,5-androstadiene-17β-ol.

In accordance with the above procedure, but starting with cyclopentanol, n-butanol or benzyl alcohol in place of cyclohexanol there are obtained the corresponding 3-cyclopentoxy-19-nor-3,5-androstadiene-17β-ol, 3-n-butoxy-19-nor-3,5-androstadiene-17β-ol and 3-benzyloxy-19-nor-3,5-androstadiene-17β-ol.

Example 5

One and one-half grams of 3-ethoxy-19-nor-3,5-androstadiene-17β-ol is dissolved in an azeotropically dried solution consisting of 30 ml. of cyclohexanone and 150 ml. of toluene. A 20% solution of aluminum isopropoxide in toluene is added to the steroid solution and the suspension refluxed for 1 hour. To the cooled suspension is added 30 ml. of saturated Rochelle salts (potassium sodium tartrate) and the mixture stirred for 30 minutes. The product is filtered through Super-Cel (infusorial earth), washed with water, dried and concentrated in vacuo. The crude product is chromatographed on 90 g. of acid-washed alumina and eluted with ether-petroleum ether mixtures to yield 3-ethoxy-19-nor-3,5-androstadiene-17-one.

In accordance with the above procedure, but starting with 3 - cyclopentoxy - 19 - nor - 3,5 - androstadiene-17β-ol, there is obtained the corresponding 3-cyclopentoxy-19-nor-3,5-androstadiene-17-one.

Example 6

A solution of 400 mg. of 3-n-butoxy-19-nor-3,5-androstadiene-17β-ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C. and then with water until neutral. The organic solvent layer is then dried, the solvent is evaporated therefrom in vacuo, and the residual crystalline material is purified by crystallization from a mixture of ethyl acetate and ether to give 3-n-butoxy-19-nor-3,5-androstadiene-17-one.

In accordance with the foregoing procedure, but starting with 3-benzyloxy-19-nor-3,5-androstadiene-17β-ol there is obtained the corresponding 3-benzyloxy-19-nor-3,5-androstadiene-17-one.

Example 7

To a solution of 0.15 N methyl lithium in 130 ml. of ether is added 6.6 ml. of cis-dichloroethylene in 45 ml. of ether. The resulting mixture is allowed to stir for 2 hours. To the resultant suspension is added 500 mg. of 3-ethoxy-19-nor-3,5-androstadiene-17-one in 10 ml. of benzene and 25 ml. of ether. The suspension is stirred overnight and subsequently poured into ice water. The ether layer is separated, and the aqueous solution is extracted 2 times with 100 ml. portions of ether. The combined ethereal solution is washed with water, dried and concentrated. The crude product is chromatographed on 25 mg. of acid-washed alumina. Elution with ether-petroleum ether mixtures affords 17α-chloroethynyl-3-ethoxy-19-nor-3,5-androstadiene-17β-ol.

In accordance with the foregoing procedure, but substituting dibromoethylene for dichloroethylene, there is obtained the corresponding 17α-bromoethynyl-3-ethoxy-19-nor-3,5-androstadiene-17β-ol.

Example 8

To a solution of 0.15 N methyl lithium in 130 ml. of ether is added 6.6 ml. of cis-dichloroethylene in 45 ml. of ether. The resulting mixture is allowed to stir for 2 hours. To the resultant suspension is added 500 mg. of 3-cyclopentoxy-19-nor-3,5-androstadiene-17-one in 10 ml. of benzene and 25 ml. of ether. The suspension is stirred overnight and subsequently poured into ice water. The ether layer is separated, and the aqueous solution is extracted 2 times with 100 ml. portions of ether. The combined ethereal solution is washed with water, dried and concentrated. The crude product is chromatographed on 25 mg. of acid-washed alumina. Elution with ether-petroleum ether mixtures affords 17α-chloroethynyl - 3 - cyclopentoxy - 19 - nor - 3,5 - androstadiene-17β-ol.

In accordance with the foregoing procedure, but substituting dibromoethylene for dichloroethylene there is obtained the corresponding 17α-bromoethynyl-3-cyclopentoxy-19-nor-3,5-androstadiene-17β-ol.

Example 9

To a solution of 0.15 N methyl lithium in 130 ml. of ether is added 6.6 ml. of cis-dichloroethylene in 45 ml. of ether. The resulting mixture is allowed to stir for 2 hours. To the resultant suspension is added 500 mg. of 3-benzyloxy-19-nor-3,5-androstadiene-17-one in 10 ml. of benzene and 25 ml. of ether. The suspension is stirred overnight and subsequently poured into ice water. The ether layer is separated, and the aqueous solution is extracted 2 times with 100 ml. portions of ether. The combined ethereal solution is washed with water, dried and concentrated. The crude product is chromatographed on 25 mg. of acid-washed alumina. Elution with ether-petroleum ether mixtures affords 17a-chloroethynyl-3-benzyloxy-19-nor-3,5-androstadiene-17β-ol.

In accordance with the foregoing procedure, but substituting dibromoethylene for dichloroethylene, there is obtained the corresponding 17α-bromoethynyl-3-benzyloxy-19-nor-3,5-androstadiene-17β-ol.

Example 10

A solution consisting of 10 mg. of 17α-chloroethynyl-3 - ethoxy - 19 - nor - 3,5 - androstadiene - 17β - ol, 2 cc. of acetone and 2 mg. of p-toluenesulfonic acid is left standing at room temperature overnight. The reaction mixture is then poured into ice water and extracted with ether. The ether extract is washed with aqueous sodium bicarbonate solution, dried over sodium sulfate and concentrated in vacuo. Crystallization from ethyl acetate affords 17α-chloroethynyl-17β-hydroxy-19-nor - 4 - androstene-3-one.

In accordance with the foregoing procedure, but starting with 17α - bromoethynyl - 3 - cyclopentoxy - 19-nor - 3,5 - androstadiene - 17β - ol, 17α - fluoroethynyl-3 - benzyloxy - 19 - nor - 3,5 - androstadiene - 17β - ol or 17α - chloroethynyl - 3 - n - butoxy - 19 - nor - 3,5-androstadiene-17β-ol there are obtained the corresponding 17α - bromoethynyl - 19 - nor - 4 - androstene - 17β-ol - 3 - one, 17α - fluoroethynyl - 19 - nor - 4 - androstene - 17β - ol - 3 - one and 17 - chloroethynyl - 19-nor-4-androstene-17β-ol-3-one.

Example 11

A suspension consisting of 3.0 g. of 19-nor-testosterone, 250 ml. of benzene, 15 ml. of ethylene glycol and 50 mg. of p-toluenesulfonic acid is refluxed using a water separator for 20 hours, cooled and dilute sodium bicarbonate solution added. The benzene layer is separated, washed with water, dried and concentrated to yield a mixture of 3 - ethylenedioxy - 19 - nor - 5 - androstene-17β - ol and 3 - ethylenedioxy - 19 - nor - 5(10) - androstene-17β-ol.

Example 12

One and one-half grams of the mixture of 3-ethylenedioxy - 19 - nor - 5 - androstene - 17β - ol and 3-ethylenedioxy - 19 - nor - 5(10) - androstene - 17β - ol is dissolved in an azeotropically dried solution consisting of 30 ml. of cyclohexanone and 150 ml. of toluene. A 20% solution of aluminum isopropoxide in toluene is added to the steroid reaction mixture and the suspension refluxed for 1 hour. To the cooled suspension is added 30 ml. of saturated Rochelle salts (potassium sodium tartrate) and the mixture stirred for 30 minutes. The product is filtered through Super-Cel, washed with water, dried and concentrated in vacuo. The crude product is chromatographed on 90 g. of acid-washed alumina eluted with ether-petroleum ether mixtures to yield a mixture of 3-ethylenedioxy-19-nor-5-androstene-17-one and 3-ethylenedioxy-19-nor-5(10)-androstene-17-one.

Example 13

A solution of 400 mg. of the mixture of 3-ethylenedioxy - 19 - nor - 5 - androstene - 17β - ol and 3 - ethylenedioxy - 19 - nor - 5(10) - androstene - 17β - ol in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give a mixture of 3-ethylenedioxy-19-nor-5-androstene-17-one and 3-ethylenedioxy-19-nor-5(10)-androstene-17-one.

Example 14

To a solution of 0.15 N methyl lithium in 130 ml. of ether is added 6.6 ml. of cis-dichloroethylene in 45 ml. of ether. The resulting mixture is allowed to stir for 2 hours. To the resultant suspension is added 500 mg. of a mixture of 3-ethylenedioxy-19-nor-5-androstene-17-one and 3-ethylenedioxy-19-nor-5(10)-androstene-17-one in 10 ml. of benzene and 25 ml. of ether. The suspension is stirred overnight and subsequently poured into ice water. The ether layer is separated, and the aqueous solution is extracted 2 times with 100 ml. portions of ether. The combined ethereal solution is washed with water, dried and concentrated. The crude product is chromatographed on 25 mg. of acid-washed alumina. Elution with ether-petroleum ether mixtures affords a mixture of 17α - chloroethynyl - 3 - ethylenedioxy - 19-nor - 5 - androstene - 17β - ol and 17α - chloroethynyl-3-ethylenedioxy-19-nor-5(10)-androstene-17β-ol.

In accordance with the foregoing procedure, but substituting dibromoethylene for dichloroethylene, there is obtained a mixture of the corresponding 17α-bromoethylnyl - 3 - ethylenedioxy - 19 - nor - 5 - androstene-17β - ol and 17 - bromoethynyl - 3 - ethylenedioxy-5(10)-androstene-17β-ol.

Example 15

To a stirred solution of 1.9 gms. of a mixture of 17α-chloroethynyl - 3 - ethylenedioxy - 19 - nor - 5 - androstene - 17β - ol and 17α - chloroethynyl - 3 - ethylenedioxy-19-nor-5(10)-androstene-17β-ol dissolved in 41 ml. of acetone is added 3 ml. of concentrated hydrochloric acid and 2.1 ml. of water. The reaction mixture is stirred at room temperature for 12–24 hours. The acetone is removed under reduced pressure. The residue is dissolved in about 200 ml. of ether and washed with water until the washings are neutral. The ether solution is dried over sodium sulfate and evaporated to dryness. The residue affords 17α-chloroethynyl- 19-nor-4-androstene-17β-ol-3-one.

In accordance with the foregoing procedure, but starting with 17α - bromoethynyl - 3 - ethylenedioxy - 19 - nor-5-androstene-17β-ol and 17α-bromoethynyl-3-ethylenedioxy-19-nor-5(10)-androstene-17β-ol there is obtained the corresponding 17a - bromoethynyl-19-nor - 4 - androstene-17β-ol-3-one.

Various changes and modifications may be made in carrying out the present invention without departing from the spirit and scope thereof. Insofar as these changes and modifications are within the purview of the annexed claims, they are to be considered as part of our invention.

We claim:
1. The process for the preparation of 17α-haloethynyl-19-nor-4-androstene-17β-ol-3-one which comprises reacting 19-nor-4-androstene-17β-ol-3-one with an orthoformic ester in the presence of an acidic catalyst thereby forming the corresponding 19-nor-3,5-androstadiene-17β-ol 3-enol ether, reacting said enol ether with an oxidizing agent to form the corresponding 19-nor-3,5-androstadiene-17-one 3-enol ether, contacting said 17-keto compound with a haloethyne, thereby forming the corresponding 17α-haloethynyl-19-nor-3,5-androstadiene-17β-ol 3-enol ether, and reacting said 17α-haloethynyl compared with a strong acid.

2. The process which comprises reacting a 19-nor-3,5-androstadiene-17β-ol-3-enol ether wherein said ether moiety is selected from the group consisting of alkoxy, cycloalkoxy, and aralkoxy groups with an oxidizing agent, thereby forming the corresponding 19-nor-3,5-androstadiene-17-one 3-enol ether.

3. The process which comprises reacting 3-ethoxy-19-nor-3,5-androstadiene-17β-ol with aluminum isopropoxide and cyclohexanone to form 3-ethoxy-19-nor-3,5-androstadiene-17-one.

4. The process which comprises reacting a 19-nor-3,5-androstadiene-17-one 3-enol ether with a haloethyne, thereby forming the corresponding 17α-haloethynyl-19-nor-3,5-androstadiene-17β-ol 3-enol ether.

5. The process which comprises reacting 3-ethoxy-17α-chloroethynyl-19-nor-3,5-androstadiene-17-one with cis-1,2-dichloroethylene in the presence of methyl lithium in an inert organic solvent to form 3-ethoxy-17α-chloroethynyl-19-nor-3,5-androstadiene-17β-ol.

6. The process which comprises reacting a 17α-haloethynyl-19-nor-3,5-androstadiene-17β-ol with a strong acid thereby forming the corresponding 17α-haloethynyl-19-nor-4-androstene-17β-ol-3-one.

7. The process which comprises reacting 3-ethoxy-17α-chloroethynyl-19-nor-3,5-androstadiene-17β-ol with p-toluenesulfonic acid to form 17α-chloroethynyl-19-nor-4-androstene-17β-ol-3-one.

8. The process which comprises reacting a 19-nor-4-androstene-3,17-dione compound selected from the group consisting of 19-nor-4-androstene-3,17-dione, its 3-enol ethers and 3-ketals, with a haloethyne thereby forming the corresponding 17α-halo ethynyl-19-nor-4-androstene-17β-ol-3-one compound.

References Cited by the Examiner
UNITED STATES PATENTS

| | | | |
|---|---|---|---|
| 2,774,777 | 12/1956 | Djerassi et al. | 260—397.4 |
| 3,019,241 | 1/1962 | Ercoli | 260—397.4 |
| 3,032,563 | 5/1962 | Muller et al. | 260—397.3 |
| 3,072,646 | 1/1963 | Fried et al. | 260—397.4 |

LEWIS GOTTS, *Primary Examiner.*

MORRIS LIEBMAN, *Examiner.*